(12) United States Patent
Tseng et al.

(10) Patent No.: US 10,690,887 B2
(45) Date of Patent: Jun. 23, 2020

(54) WIDE-ANGLE LENS ASSEMBLY

(71) Applicant: CALIN TECHNOLOGY CO., LTD., Taichung (TW)

(72) Inventors: Chien-Hsiung Tseng, Hsinchu (TW); Shu-Chuan Hsu, Taichung (TW)

(73) Assignee: CALIN TECHNOLOGY CO., LTD., Taichung (TW)

( * ) Notice: Subject to any disclaimer, the term of this patent is extended or adjusted under 35 U.S.C. 154(b) by 176 days.

(21) Appl. No.: 16/004,109

(22) Filed: Jun. 8, 2018

(65) Prior Publication Data

US 2019/0339490 A1   Nov. 7, 2019

(30) Foreign Application Priority Data

May 7, 2018 (TW) .............................. 107115477 A (51) Int. Cl.
*G02B 13/00* (2006.01)
*G02B 13/04* (2006.01)
*G02B 9/64* (2006.01)

(52) U.S. Cl.
CPC ........... *G02B 13/0045* (2013.01); *G02B 9/64* (2013.01); *G02B 13/04* (2013.01)

(58) Field of Classification Search
CPC ...... G02B 13/0045; G02B 9/64; G02B 13/18; G02B 27/0025; G02B 13/04

USPC ........................................................ 359/708
See application file for complete search history.

(56) References Cited

U.S. PATENT DOCUMENTS

| 5,861,999 | A  | * | 1/1999 | Tada ...................... | G02B 13/06 359/713 |
| 9,983,389 | B2 | * | 5/2018 | Lee ......................... | G02B 13/06 |
| 2016/0170182 | A1 | * | 6/2016 | Tanaka ................ | G02B 13/0045 359/713 |
| 2017/0045714 | A1 | * | 2/2017 | Huang ..................... | G02B 9/64 |

* cited by examiner

*Primary Examiner* — Mohammed A Hasan
(74) *Attorney, Agent, or Firm* — Tracy M Heims; Apex Juris, PLLC.

(57) ABSTRACT

A wide-angle lens assembly includes, in order from an object side to an image side along an optical axis, a first lens with negative refractive power, a second lens with negative refractive power, a third lens with positive refractive power, a fourth lens with positive refractive power, a fifth lens with positive refractive power, a sixth lens with negative refractive power, and a seventh lens with positive refractive power; wherein, the wide-angle lens assembly satisfies the following condition: $0.2<f/f7<0.5$; where f is a focal length of the wide-angle lens assembly and f7 is a focal length of the seventh lens. With the aforementioned design, the wide-angle lens assembly can have a large FOV and an improved imaging quality.

10 Claims, 8 Drawing Sheets

FIG. 7

WIDE-ANGLE LENS ASSEMBLY

BACKGROUND OF THE INVENTION

Technical Field

The present invention relates generally to an optical lens assembly, and more particularly relates to a wide-angle lens assembly.

Description of Related Art

In recent years, the booming growth of the portable electronic devices with integrated imaging capabilities has created a rise in demand of optical systems. Generally, the photosensitive elements of conventional optical systems mainly consist of a Charge Coupled Device (CCD) or a Complementary Metal-oxide Semiconductor Sensors (CMOS). With the advancement in the semiconductor manufacturing process technology, the pixel sizes of the photosensitive elements are made smaller, which enables the optical system to provide a higher image resolution. In addition, in order to adapt to temperature changes in ambient environment for car lens, the demand on the lens quality with respect to the temperature has been also increased. Hence, the need for a higher imaging quality has become stronger.

However, since the conventional wide-angle lens assembly can no longer meet the current needs, it is necessary to provide a wide-angle lens assembly which can effectively reduce the distortion, enhance imaging quality, and have a large angle of view.

BRIEF SUMMARY OF THE INVENTION

In view of the above, an object of the present invention is to provide a wide-angle lens assembly that can effectively reduce distortion, improve imaging quality, and have a large FOV.

The present invention provides a wide-angle lens assembly which includes, in order from an object side to an image side along an optical axis, a first lens with negative refractive power, a second lens with negative refractive power, a third lens with positive refractive power, a fourth lens with positive refractive power, a fifth lens with positive refractive power, a sixth lens with negative refractive power, and a seventh lens with positive refractive power; wherein, the wide-angle lens assembly satisfies the following condition: $0.2<f/f7<0.5$; where f is a focal length of the wide-angle lens assembly and f7 is a focal length of the seventh lens.

The advantage of the present invention is that, with the above design, a wide-angle lens assembly with low distortion, high imaging quality, and a large FOV can be provided.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
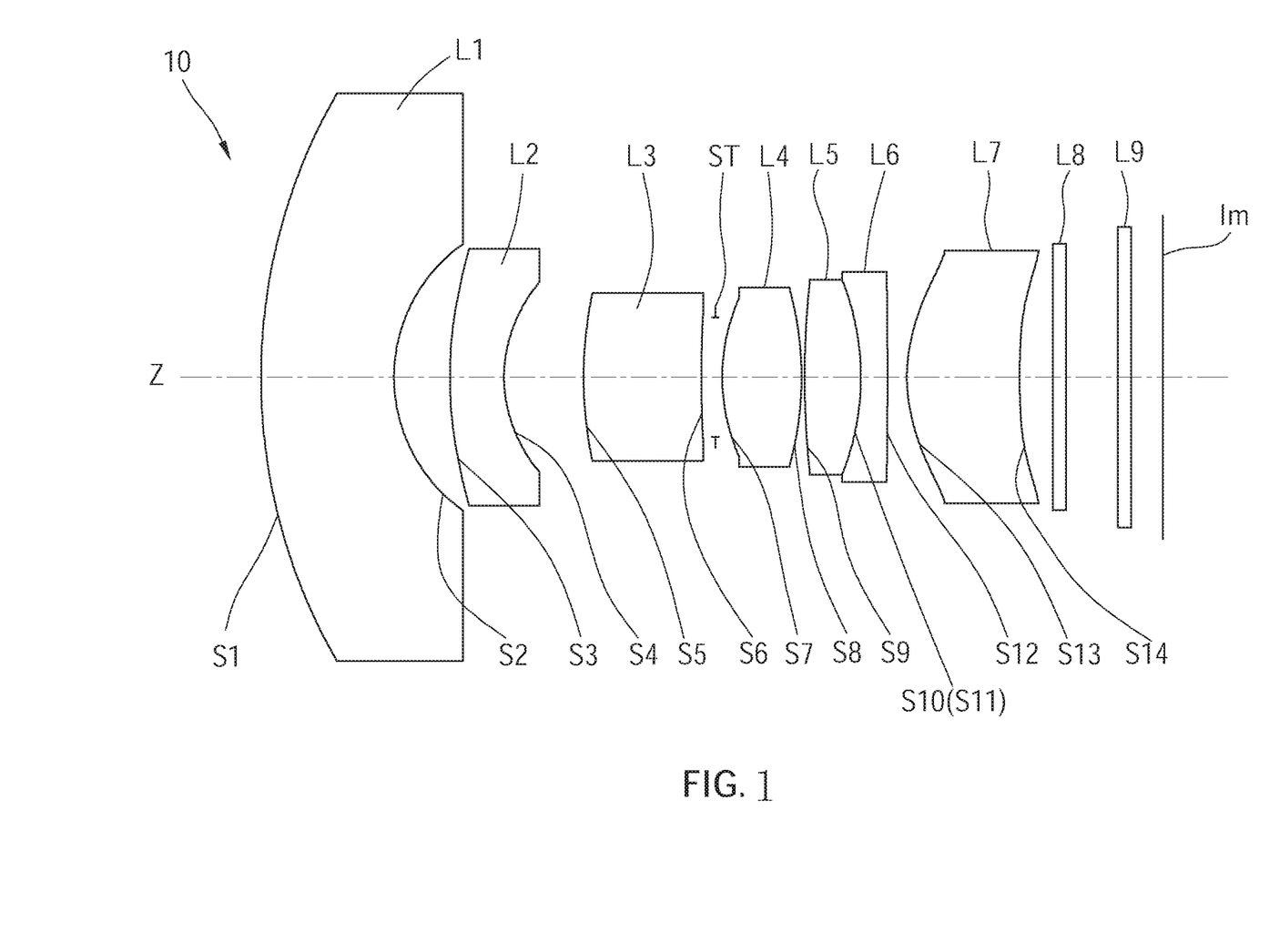
FIG. 1 is a schematic view of a wide-angle lens assembly according to a first embodiment of the present invention.

The following illustrative embodiments and drawings are provided to illustrate the disclosure of the present invention, these and other advantages and effects can be clearly understood by persons skilled in the art after reading the disclosure of this specification. As shown in FIG. 1, a wide-angle lens assembly 10 of a first embodiment according to the present invention includes, in order from an object side to an image side along an optical axis Z, a first lens L1, a second lens L2, a third lens L3, a fourth lens L4, a fifth lens L5, a sixth lens L6, and a seventh lens L7.

The first lens L1 has negative refractive power, and preferably, the first lens L1 is made of glass and has an object-side surface S1 being convex, and an image-side surface S2 being concave.

The second lens L2 has negative refractive power, and preferably, the second lens L2 is made of glass and has an object-side surface S3 being convex and an image-side surface S4 being concave. In addition, at least one surface of the second lens L2 is aspheric. For example, in the current embodiment, both of the object-side surface S3 and the image-side surface S4 of the second lens L2 are aspheric surfaces.

The third lens L3 has positive refractive power, and preferably, the third lens L3 is made of glass and has an object-side surface S5 being convex and an image-side surface S6 being concave.

The fourth lens L4 has positive refractive power, and preferably, the fourth lens L4 is made of glass and has an object-side surface S7 being convex, and an image-side surface S8 being convex. In addition, at least one surface of the fourth lens L4 is aspheric. For example, in the current embodiment, both of the object-side surface S7 and the image-side surface S8 of the fourth lens L4 are aspheric surfaces.

The fifth lens L5 has positive refractive power, and preferably, the fifth lens L5 is made of glass and has an object-side surface S9 being convex and an image-side surface S10 being convex.

The sixth lens L6 has negative refractive power, and preferably, the sixth lens L6 is made of glass and has an object-side surface S11 being concave and an image-side surface S12 being convex.

The seventh lens L7 has positive refractive power, and preferably, the seventh lens L7 is of a meniscus shape made of glass having an object side surface S13 being convex and an image side surface S14 being concave. In addition, at least one surface of the seventh lens L7 is aspheric. For example, in the current embodiment, both of the object-side surface S13 and the image-side surface S14 of the seventh lens L7 are aspheric surfaces.

In addition, it is preferable that the fifth lens L5 is adhered to the sixth lens L6 to form a doublet, thereby effectively improving the chromatic aberration of the lens assembly and avoiding generation of aberration.

Furthermore, in order to maintain good optical performance of the wide-angle lens assembly 10 of the present invention, the wide-angle lens assembly 10 satisfies the following conditions:

$$0.2 < f/f7 < 0.5; \quad (1)$$

$$-0.9 < f/f6 < -0.4; \quad (2)$$

$$Vd4 > 60; \quad (3)$$

$$4 < (f1+f2+f3+f4+f5+f6+f7)/f < 6; \quad (4)$$

$$3 < (R1/R2) < 6; \quad (5)$$

where, f is a focal length of the wide-angle lens assembly 10; f1 is a focal length of the first lens L1; f2 is a focal length of the second lens L2; f3 is a focal length of the third lens L3; f4 is a focal length of the fourth lens L4; f5 is a focal length of the fifth lens L5; f6 is a focal length of the sixth lens L6; f7 is a focal length of the seventh lens L7; Vd4 is an Abbe number of the fourth lens L4; R1 is a curvature radius (R value) of the object-side surface S1 of the first lens L1; R2 is a curvature radius (R value) of the image-side surface S2 of the first lens L1.

With the above design, the wide-angle lens assembly 10 can have better optical imaging quality and a larger angle of view. In more details, by satisfying the aforementioned conditions (1) and (5), it can effectively enhance the wide-angle characteristic and provide a larger angle of view for the lens assembly; by satisfying the aforementioned condition (2), it can effectively correct each kind of aberrations for the lens assembly; by satisfying the aforementioned conditions (3) and (4), chromatic aberration can be effectively eliminated.

In addition, the wide-angle lens assembly 10 can further include an aperture ST, a filter L8, and a protective glass L9. The aperture ST is disposed between the third lens L3 and the fourth lens L4. The filter L8 is disposed between the seventh lens L7 and the image plane $I_m$, and can be an infrared filter. Wherein, the filter L8 has an object-side surface and an image-side surface, both of which are planar, and the material thereof is glass, which would not affect the focal length of the wide-angle lens assembly 10. The protective glass L9 is disposed between the filter L8 and the image plane $I_m$. Wherein, the protective glass L9 has an object-side surface and an image-side surface, both of which are planar, and the material thereof is glass, which would not affect the focal length of the wide-angle lens assembly 10.

The parameters of the lenses of the wide-angle lens assembly 10 of the first embodiment according to the present invention are shown in Table 1, which includes a focal length f, an aperture value $F_{no}$ and an angle of view FOV of the wide-angle lens assembly 10, a curvature radius (R value) R of each lens, and a distance between each surface to a next surface on the optical axis, a refractive index $N_d$ for each lens, and an Abbe number $V_d$ for each lens, wherein the units of the focal length, curvature radius (R value), and thickness are expressed in mm.

TABLE 1

| f = 3.724 mm; $F_{no}$ = 2.0; FOV = 145° | | | | |
|---|---|---|---|---|
| Surface # | Radius of curvature (mm) | Thickness (mm) | Refractive index Nd | Abbe number Vd | |
| 1 | 17.081 | 4.000 | 1.8 | 46.5 | L1 |
| 2 | 4.902 | 1.676 | | | |
| 3 | 11.711 | 1.631 | 1.77 | 49.5 | L2 |
| 4 | 4.240 | 2.393 | | | |
| 5 | 12.188 | 3.535 | 1.92 | 18.9 | L3 |
| 6 | 35.305 | 0.427 | | | |
| 7 | Infinity | 0.204 | | | |
| 8 | 5.645 | 2.385 | 1.51 | 64.1 | L4 |
| 9 | -10.876 | 0.100 | | | |
| 10 | 28.000 | 1.683 | 1.48 | 70.2 | L5 |
| 11 | -7.932 | 0.800 | 1.92 | 18.9 | L6 |
| 12 | -233.808 | 0.588 | | | |
| 13 | 5.210 | 3.383 | 1.77 | 49.5 | L7 |
| 14 | 23.196 | 1.000 | | | |
| 15 | Infinity | 0.400 | 1.51 | 64.1 | L8 |
| 16 | Infinity | 1.557 | | | |
| 17 | Infinity | 0.400 | 1.51 | 64.1 | L9 |
| 18 | Infinity | 0.950 | | | |
| 19 | Infinity | | | | |

As can be seen from Table 1, the focal length f of the wide-angle lens assembly 10 of the first embodiment is 3.724 mm, the focal length f1 of the first lens L1 is −9.982 mm, the focal length f2 of the second lens L2 is −9.475 mm, the focal length f3 of the third lens L3 is 18.609 mm, the focal length f4 for the fourth lens L4 is 7.548 mm, the focal length f5 of the fifth lens L5 is 12.844 mm for, the focal length f6 of the sixth lens L6 is −8.829 mm, and the focal length f7 of the seventh lens L7 is 8.008 mm, the Abbe number Vd41 of the fourth lens L4 is 64.1, the curvature radius R1 of the object-side surface S1 of the first lens L1 is 17.081 mm, and the curvature radius R2 of the image-side surface S2 of the first lens L1 is 4.902 mm From the above, it can be concluded that f/f7=0.465, f/f6=−0.422, Vd4=64.1, (f1+f2+f3+f4+f5+f6+f7)/f=5.028, and (R1/R2)=3.484, satisfying the conditions (1) to (5).

In addition, in conjunction with the parameters show in Table 2, surface sags of each aspheric surface of the second lens L2, the fourth lens L4, and the seventh lens L7 of the wide-angle lens assembly 10 of the first embodiment, i.e., the object-side Surface S S3, S7 and S13, and the image-side Surface S S4, S8 and S14 are obtained by the following formula:

$$z = \frac{ch^2}{1+\sqrt{1-(1+k)c^2h^2}} + Ah^4 + Bh^6 + Ch^8 + Dh^{10} + Eh^{12} + Fh^{14} + Gh^{16}$$

where, z is the aspheric surface sag; c is the reciprocal of the curvature radius; h is half the off-axis height of the surface; k is the conic coefficient and A to G respectively represent different order coefficient of h.

TABLE 2

| | L2 | | L4 | | L7 | |
|---|---|---|---|---|---|---|
| | S3 | S4 | S7 | S8 | S13 | S14 |
| K | 0.00000E+00 | 0.00000E+00 | −6.04523E−01 | 0.00000E+00 | −1.19077E+00 | 0.00000E+00 |
| A | −2.93756E−04 | 2.53957E−04 | −4.29749E−04 | −1.30291E−03 | −3.28922E−04 | 3.23421E−03 |
| B | −1.00890E−05 | −1.84944E−04 | −3.51003E−05 | 1.55768E−06 | −4.17623E−05 | −8.61734E−05 |
| C | −2.12604E−07 | −5.29307E−06 | 1.59822E−05 | 8.53531E−06 | 5.07265E−06 | −3.54564E−06 |
| D | 5.15175E−08 | 1.94569E−06 | 1.75532E−07 | 1.20496E−06 | −3.52950E−07 | 0.00000E+00 |
| E | 0.00000E+00 | 0.00000E+00 | 0.00000E+00 | 0.00000E+00 | 0.00000E+00 | 0.00000E+00 |
| F | 0.00000E+00 | 0.00000E+00 | 0.00000E+00 | 0.00000E+00 | 0.00000E+00 | 0.00000E+00 |
| G | 0.00000E+00 | 0.00000E+00 | 0.00000E+00 | 0.00000E+00 | 0.00000E+00 | 0.00000E+00 |

Figure 2A:
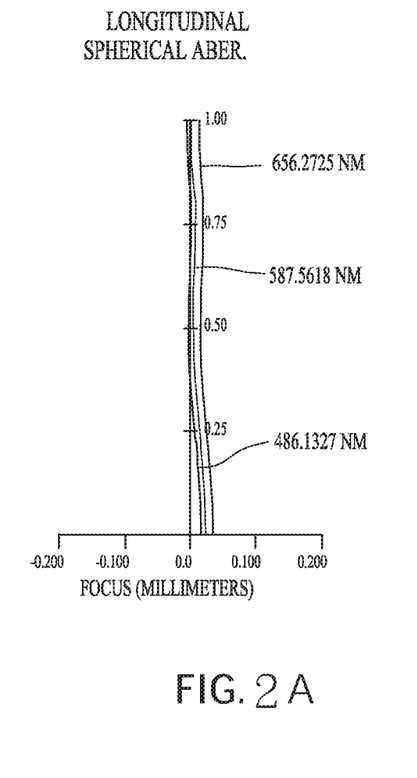
FIG. 2A is a diagram showing a longitudinal spherical aberration of the wide-angle lens assembly of the first embodiment according to the present invention.
Figure 2B:
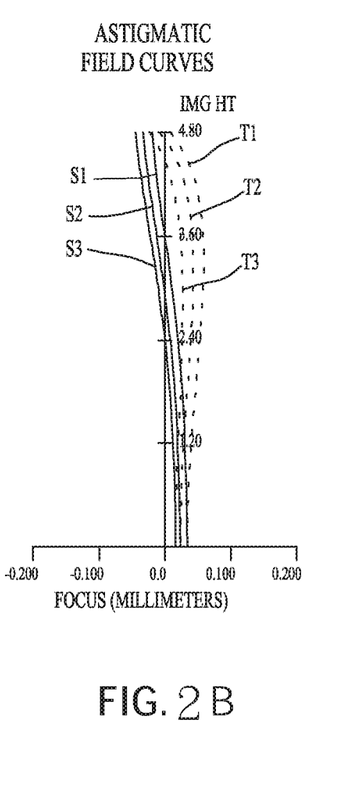
FIG. 2B is a diagram showing astigmatic field curves of the wide-angle lens assembly according to the first embodiment of the present invention.
Figure 2C:
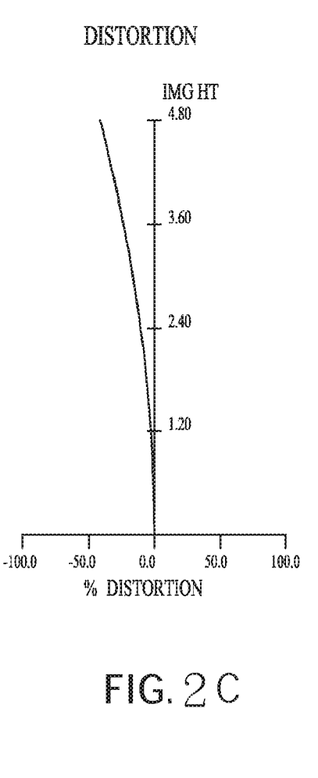
FIG. 2C is a diagram showing distortion of the wide-angle lens assembly according to the first embodiment of the present invention.

As a result, as shown in FIG. 2A to 2C, with the aforementioned design, the wide-angle lens assembly 10 of the first embodiment according to the present invention can meet the requirement for high imaging quality, wherein FIG. 2A shows that the longitudinal spherical aberration does not exceed 0.05 mm; FIG. 2B shows that the maximum field curvature does not exceed 0 mm and 0.05 mm; FIG. 2C shows that the distortion does not exceed −50%.

Figure 3:
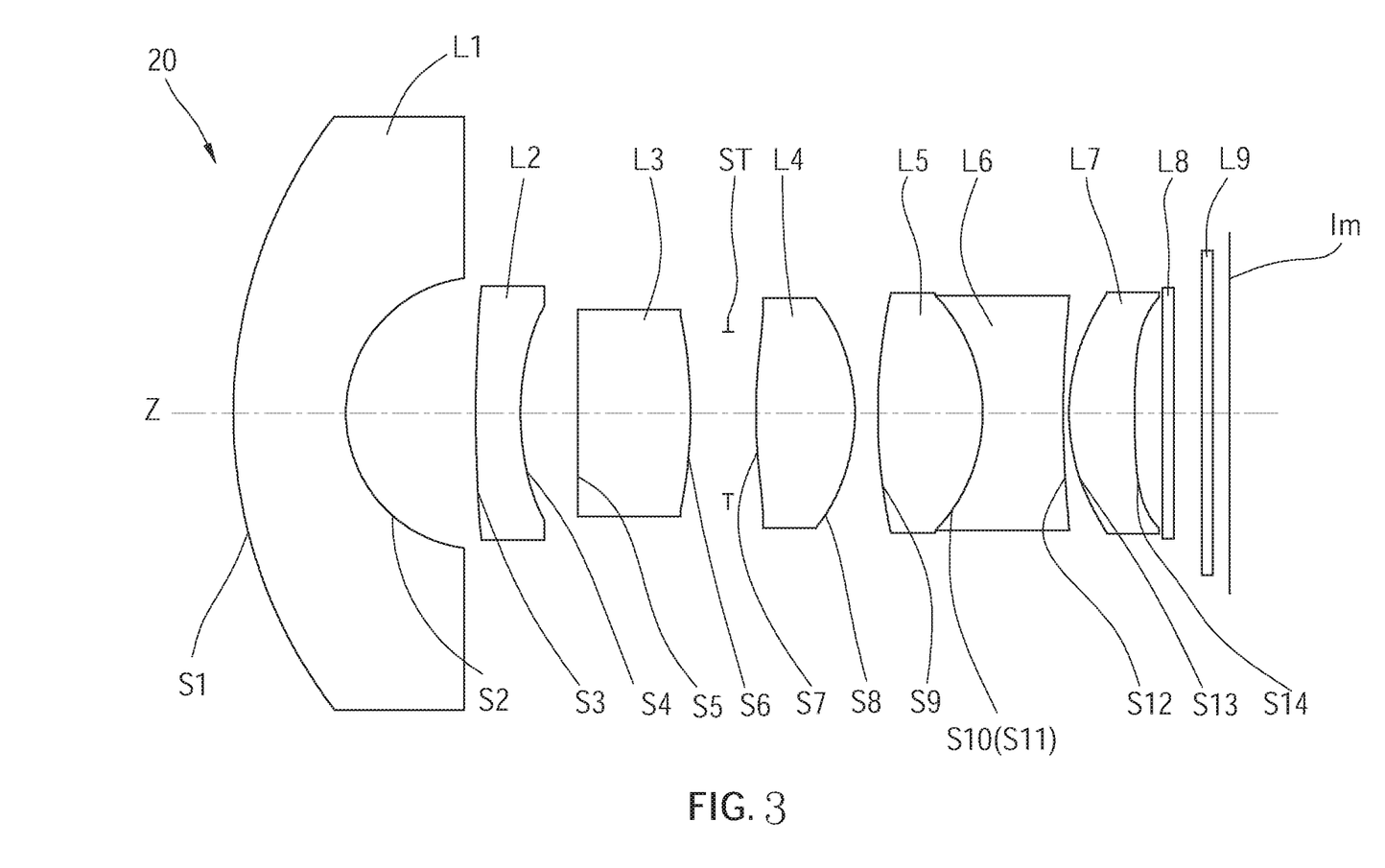
FIG. 3 is a schematic diagram of a wide-angle lens assembly according to a second embodiment of the present invention.

As shown in FIG. 3, a wide-angle lens assembly 20 of a second embodiment according to the present invention includes, in order from an object side to an image side along an optical axis Z, a first lens L1, a second lens L2, a third lens L3, a fourth lens L4, a fifth lens L5, a sixth lens L6, and a seventh lens L7.

The first lens L1 has negative refractive power, and preferably, the first lens L1 is made of glass and has an object-side surface S1 being convex, and an image-side surface S2 being concave.

The second lens L2 has negative refractive power, and preferably, the second lens L2 is made of glass. In addition, at least one surface of the second lens L2 is aspheric, for example, in the current embodiment, both of an object-side surface S3 and an image-side surface S4 of the second lens L2 are aspheric surfaces.

The third lens L3 has positive refractive power, and preferably, the third lens L3 is made of glass and has an object-side surface S5 being convex and an image-side surface S6 being convex.

The fourth lens L4 has positive refractive power, and preferably, the fourth lens L4 is made of glass. In addition, at least one surface of the fourth lens L4 is aspheric, for example, in the current embodiment, both of the object-side surface S7 and the image-side surface S8 of the fourth lens L4 are aspheric surfaces.

The fifth lens L5 has positive refractive power, and preferably, the fifth lens L5 is made of glass and has an object-side surface S9 being convex and an image-side surface S10 being convex.

The sixth lens L6 has negative refractive power, and preferably, the sixth lens L6 is made of glass and has an object-side surface S11 being concave and an image-side surface S12 being concave.

The seventh lens L7 has positive refractive power, and preferably, the seventh lens L7 is of a meniscus shape made of glass having an object side surface S13 being convex and an image side surface S14 being concave. In addition, at least one surface of the seventh lens L7 is aspheric. For example, in the current embodiment, both of the object-side surface S13 and the image-side surface S14 of the seventh lens L7 are aspheric surfaces.

In addition, it is preferable that the fifth lens L5 is adhered to the sixth lens L6 to form a doublet, thereby effectively improving the chromatic aberration of the lens assembly and avoiding generation of aberration.

Furthermore, in order to maintain good optical performance of the wide-angle lens assembly 20 of the present invention, the wide-angle lens assembly 20 satisfies the following conditions:

$$0.2 < f/f7 < 0.5; \quad (1)$$

$$-0.9 < f/f6 < -0.4; \quad (2)$$

$$Vd4 > 60; \quad (3)$$

$$4 < (f1+f2+f3+f4+f5+f6+f7)/f < 6; \quad (4)$$

$$3 < (R1/R2) < 6; \quad (5)$$

where, f is a focal length of the wide-angle lens assembly 20; f1 is a focal length of the first lens L1; f2 is a focal length of the second lens L2; f3 is a focal length of the third lens L3; f4 is a focal length of the fourth lens L4; f5 is a focal length of the fifth lens L5; f6 is a focal length of the sixth lens L6; f7 is a focal length of the seventh lens L7; Vd4 is an Abbe number of the fourth lens L4; R1 is a curvature radius (R value) of the object-side surface S1 of the first lens L1; R2 is a curvature radius (R value) of the image-side surface S2 of the first lens L1.

With the above design, the wide-angle lens assembly 20 can have better optical imaging quality and a larger angle of view. In more details, by satisfying the aforementioned conditions (1) and (5), it can effectively enhance the wide-angle characteristic and provide a larger angle of view for the lens assembly; by satisfying the aforementioned condition (2), it can effectively correct each kind of aberrations for the lens assembly; by satisfying the aforementioned conditions (3) and (4), chromatic aberration can be effectively eliminated.

In addition, the wide-angle lens assembly 20 can further include an aperture ST, a filter L8, and a protective glass L9. The aperture ST is disposed between the third lens L3 and the fourth lens L4. The filter L8 is disposed between the seventh lens L7 and the image plane $I_m$, and can be an infrared filter. Wherein, the filter L8 has an object-side surface and an image-side surface, both of which are planar, and the material thereof is glass, which would not affect the focal length of the wide-angle lens assembly 20. The protective glass L9 is disposed between the filter L8 and the image plane $I_m$. Wherein, the protective glass L9 has an object-side surface and an image-side surface, both of which are planar, and the material thereof is glass, which would not affect the focal length of the wide-angle lens assembly 20.

The parameters of the lenses of the wide-angle lens assembly 20 of the second embodiment according to the present invention are shown in Table 3, which includes a focal length f, an aperture value $F_{no}$ and an angle of view FOV of the wide-angle lens assembly 10, a curvature radius R of each lens, and a distance between each surface to a next surface on the optical axis, a refractive index $N_d$ for each lens, and an Abbe number $V_d$ for each lens, wherein the units of the focal length, curvature radius, and thickness are expressed in mm.

TABLE 3 f = 3.838 mm; $F_{no}$ = 2.0; FOV = 145°

| Surface # | Radius of curvature (mm) | Thickness (mm) | Refractive index Nd | Abbe number Vd | |
|---|---|---|---|---|---|
| 1 | 17.226 | 4.000 | 1.8 | 46.5 | L1 |
| 2 | 4.830 | 4.612 | | | |
| 3 | 45.652 | 1.590 | 1.77 | 49.5 | L2 |
| 4 | 10.108 | 2.035 | | | |
| 5 | 4048.6 | 4.000 | 1.92 | 18.9 | L3 |
| 6 | −16.995 | 1.325 | | | |
| 7 | Infinity | 1.001 | | | |
| 8 | 18.182 | 3.509 | 1.51 | 64.1 | L4 |
| 9 | −6.731 | 0.818 | | | |

TABLE 3-continued f = 3.838 mm; $F_{no}$ = 2.0; FOV = 145°

| Surface # | Radius of curvature (mm) | Thickness (mm) | Refractive index Nd | Abbe number Vd | |
|---|---|---|---|---|---|
| 10 | 20.000 | 3.724 | 1.48 | 70.2 | L5 |
| 11 | −6.000 | 2.862 | 1.92 | 18.9 | L6 |
| 12 | 40.000 | 0.207 | | | |
| 13 | 7.369 | 2.317 | 1.77 | 49.5 | L7 |
| 14 | 30.000 | 1.000 | | | |
| 15 | Infinity | 0.400 | 1.51 | 64.1 | L8 |
| 16 | Infinity | 1.000 | | | |
| 17 | Infinity | 0.400 | 1.51 | 64.1 | L9 |
| 18 | Infinity | 0.590 | | | |
| 19 | Infinity | | | | |

As can be seen from Table 3, the focal length f of the wide-angle lens assembly 20 of the second embodiment is 3.838 mm, the focal length f1 of the first lens L1 is −12.271 mm, the focal length f2 of the second lens L2 is −16.411 mm, the focal length f3 of the third lens L3 is 20.202 mm, the focal length f4 for the fourth lens L4 is 10.346 mm, the focal length f5 of the fifth lens L5 is 6.590 mm for, the focal length f6 of the sixth lens L6 is −5.945 mm, and the focal length f7 of the seventh lens L7 is 16.092 mm, the Abbe number Vd41 of the fourth lens L4 is 81.5, the curvature radius R1 of the object-side surface S1 of the first lens L1 is 17.226 mm, and the curvature radius R2 of the image-side surface S2 of the first lens L1 is 4.830 mm From the above, it can be concluded that f/f7=0.239, f/f6=−0.646, Vd4=64.1, (f1+f2+f3+f4+f5+f6+f7)/f=4.847, and (R1/R2)=3.566, satisfying the aforementioned conditions (1) to (5).

In addition, in conjunction with the parameters show in Table 4, surface sags of each aspheric surface of the second lens L2, the fourth lens L4, and the seventh lens L7 of the wide-angle lens assembly 20 of the second embodiment, i.e., the object-side surfaces S3, S7 and S13, and the image-side surfaces S4, S8 and S14 are obtained by the following formula:

$$z = \frac{ch^2}{1 + \sqrt{1-(1+k)c^2h^2}} + Ah^4 + Bh^6 + Ch^8 + Dh^{10} + Eh^{12} + Fh^{14} + Gh^{16}$$

where, z is the aspheric surface sag; c is the reciprocal of the curvature radius; h is half the off-axis height of the surface; k is the conic coefficient and A to G respectively represent different order coefficient of h.

TABLE 4

| | | L2 | | L4 | | L7 | |
|---|---|---|---|---|---|---|---|
| | | S3 | S4 | S7 | S8 | S13 | S14 |
| K | | 0.00000E+00 | 0.00000E+00 | 0.00000E+00 | 0.00000E+00 | 0.00000E+00 | 0.00000E+00 |
| A | | −3.52051E−04 | 1.52342E−04 | −3.98475E−04 | 1.92565E−04 | 1.27557E−05 | 5.11769E−04 |
| B | | 5.24330E−05 | 6.79134E−05 | −1.70707E−05 | 6.17831E−06 | 3.49941E−05 | 8.43979E−05 |
| C | | −1.21219E−05 | −2.56779E−05 | 1.49133E−06 | −3.75837E−06 | −2.30283E−06 | 4.66958E−06 |
| D | | 1.61032E−06 | 5.15786E−06 | −4.26010E−07 | 5.15744E−07 | 4.59270E−08 | −5.79764E−07 |
| E | | −1.14690E−07 | −5.24017E−07 | 3.82119E−08 | −4.46595E−08 | −2.88987E−09 | 3.16733E−08 |
| F | | 4.27592E−09 | 2.71861E−08 | −1.70671E−09 | 1.94234E−09 | 3.82476E−11 | −8.49401E−10 |
| G | | −6.44197E−11 | −5.64623E−10 | 1.99151E−11 | −3.59077E−11 | −2.96711E−14 | 9.30212E−12 |

Figure 4A:
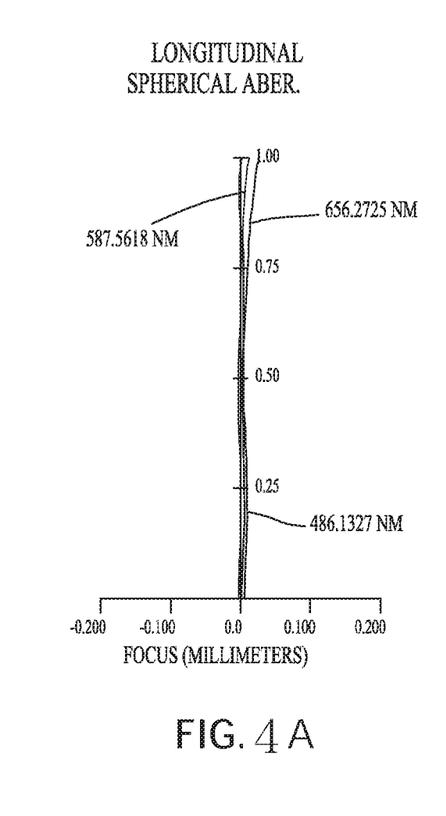
FIG. 4A is a diagram showing a longitudinal spherical aberration of the wide-angle lens assembly according to the second embodiment of the present invention.
Figure 4B:
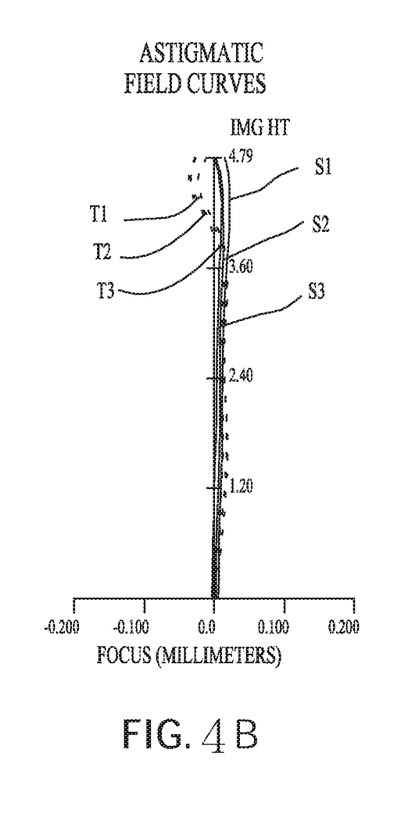
FIG. 4B is a diagram showing astigmatic field curves of the wide-angle lens assembly according to the second embodiment of the present invention.
Figure 4C:
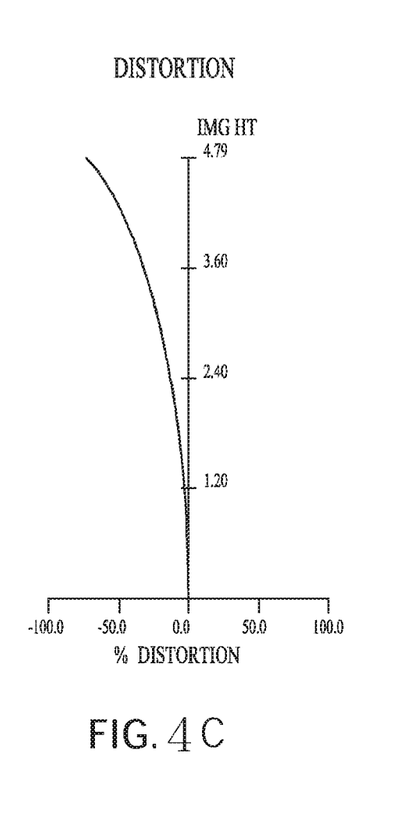
FIG. 4C is a diagram showing distortion of the wide-angle lens assembly according to the second embodiment of the present invention.

As a result, as shown in FIG. 4A to 4C, with the aforementioned design, the wide-angle lens assembly 20 of the second embodiment according to the present invention can meet the requirement for high imaging quality, wherein FIG. 4A shows that the longitudinal spherical aberration does not exceed 0.05 mm; FIG. 4B shows that the maximum field curvature does not exceed 0 mm and 0.02 mm; FIG. 4C shows that the distortion does not exceed −50%.

Figure 5:
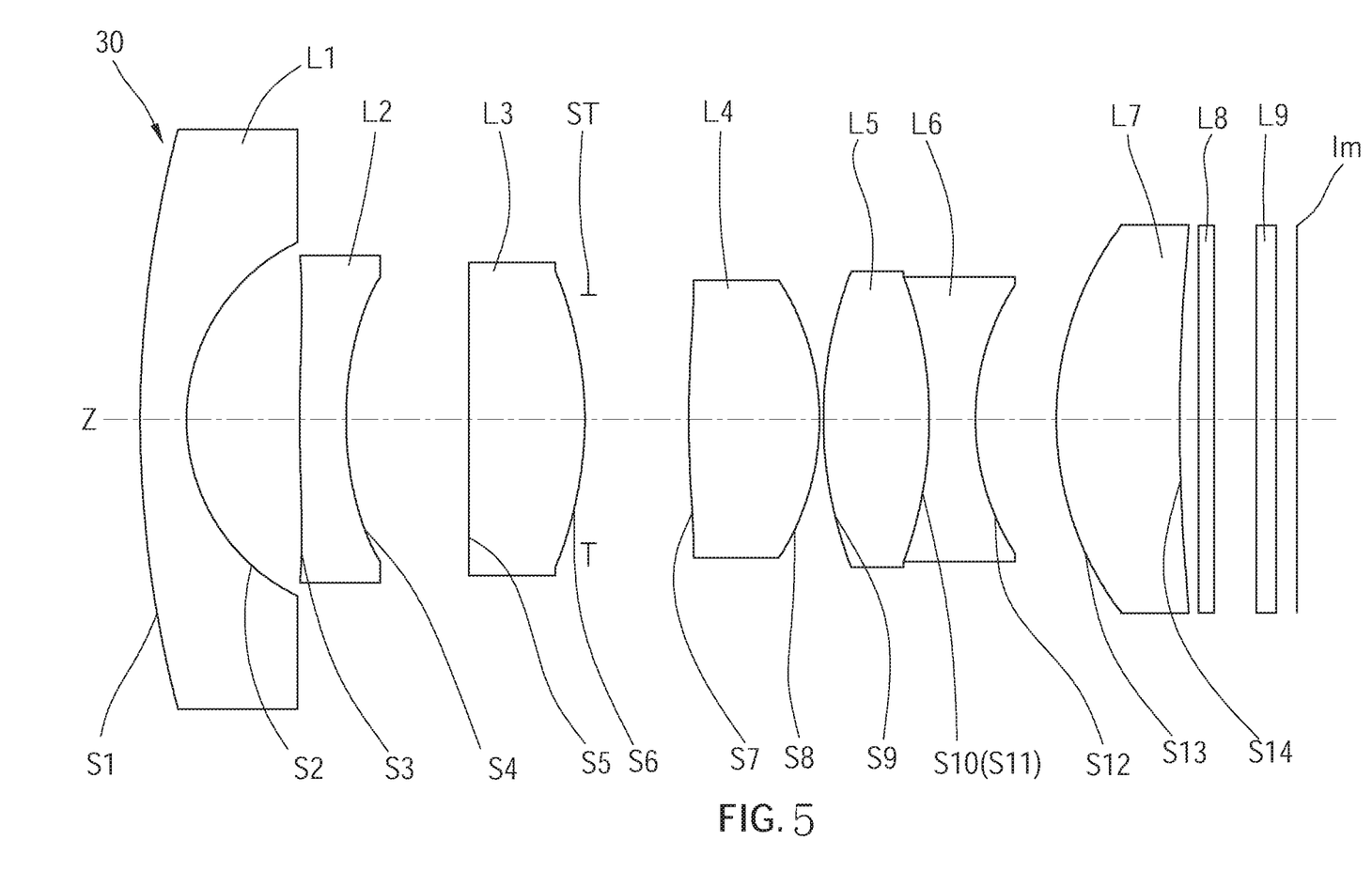
FIG. 5 is a schematic diagram of a wide-angle lens assembly according to a third embodiment of the present invention.

As shown in FIG. 5, a wide-angle lens assembly 30 of a third embodiment according to the present invention includes, in order from an object side to an image side along an optical axis Z, a first lens L1, a second lens L2, a third lens L3, a fourth lens L4, a fifth lens L5, a sixth lens L6, and a seventh lens L7.

The first lens L1 has negative refractive power, and preferably, the first lens L1 is made of glass and has an object-side surface S1 being convex, and an image-side surface S2 being concave.

The second lens L2 has negative refractive power, and preferably, the second lens L2 is made of glass. In addition, at least one surface of the second lens L2 is aspheric. For example, in the current embodiment, both of an object-side surface S3 and an image-side surface S4 of the second lens L2 are aspheric surfaces.

The third lens L3 has positive refractive power, and preferably, the third lens L3 is made of glass and has an object-side surface S5 being substantially planar and an image-side surface S6 being convex.

The fourth lens L4 has positive refractive power, and preferably, the fourth lens L4 is made of glass. In addition, at least one surface of the fourth lens L4 is aspheric. For example, in the current embodiment, both of an object-side surface S7 and an image-side surface S8 of the fourth lens L4 are aspheric surfaces.

The fifth lens L5 has positive refractive power, and preferably, the fifth lens L5 is made of glass and has an object-side surface S9 being convex and an image-side surface S10 being convex.

The sixth lens L6 has negative refractive power, and preferably, the sixth lens L6 is made of glass and has an object-side surface S11 being concave and an image-side surface S12 being concave.

The seventh lens L7 has positive refractive power, and preferably, the seventh lens L7 is of a meniscus shape made of glass having an object side surface S13 being convex and an image side surface S14 being concave. In addition, at least one surface of the seventh lens L7 is aspheric. For example, in the current embodiment, both of the object-side surface S13 and the image-side surface S14 of the seventh lens L7 are aspheric surfaces.

In addition, it is preferable that the fifth lens L5 is adhered to the sixth lens L6 to form a doublet, thereby effectively improving the chromatic aberration of the lens assembly and avoiding generation of aberration.

Furthermore, in order to maintain good optical performance of the wide-angle lens assembly 30 of the present invention, the wide-angle lens assembly 30 satisfies the following conditions:

$$0.2 \leq f/f7 < 0.5; \quad (1)$$

$$-0.9 \leq f/f6 < -0.4; \quad (2)$$

$$Vd4 > 60; \quad (3)$$

$$4 < ((f1+f2+f3+f4+f5+f6+f7)/f < 6; \quad (4)$$

$$3 < (R1/R2) < 6; \quad (5)$$

where, f is a focal length of the wide-angle lens assembly 30; f1 is a focal length of the first lens L1; f2 is a focal length of the second lens L2; f3 is a focal length of the third lens L3; f4 is a focal length of the fourth lens L4; f5 is a focal length of the fifth lens L5; f6 is a focal length of the sixth lens L6; f7 is a focal length of the seventh lens L7; Vd4 is an Abbe number of the fourth lens L4; R1 is a curvature radius (R value) of the object-side surface S1 of the first lens L1; R2 is a curvature radius (R value) of the image-side surface S2 of the first lens L1.

With the above design, the wide-angle lens assembly 20 can have better optical imaging quality and a larger angle of view. In more details, by satisfying the aforementioned conditions (1) and (5), it can effectively enhance the wide-angle characteristic and provide a larger angle of view for the lens assembly; by satisfying the aforementioned condition (2), it can effectively correct each kind of aberrations for the lens assembly; by satisfying the aforementioned conditions (3) and (4), chromatic aberration can be effectively eliminated.

In addition, the wide-angle lens assembly 30 can further include an aperture ST, a filter L8, and a protective glass L9. The aperture ST is disposed between the third lens L3 and the fourth lens L4. The filter L8 is disposed between the seventh lens L7 and the image plane $I_m$, and can be an infrared filter. Wherein, the filter L8 has an object-side surface and an image-side surface, both of which are planar, and the material thereof is glass, which would not affect the focal length of the wide-angle lens assembly 30. The protective glass L9 is disposed between the filter L8 and the image plane $I_m$. Wherein, the protective glass L9 has an object-side surface and an image-side surface, both of which are planar, and the material thereof is glass, which would not affect the focal length of the wide-angle lens assembly 30.

The parameters of the lenses of the wide-angle lens assembly 30 of the third embodiment according to the present invention are shown in Table 5, which includes a focal length f, an aperture value $F_{no}$ and an angle of view FOV of the wide-angle lens assembly 30, a curvature radius R of each lens, and a distance between each surface to a next surface on the optical axis, a refractive index $N_d$ for each lens, and an Abbe number $V_d$ for each lens, wherein the units of the focal length, curvature radius, and thickness are expressed in mm

TABLE 5 f = 4.462 mm; $F_{no}$ = 2.0; FOV = 145°

| Surface # | Radius of curvature (mm) | Thickness (mm) | Refractive index Nd | Abbe number Vd | |
|---|---|---|---|---|---|
| 1 | 29.372 | 1.200 | 1.8 | 46.5 | L1 |
| 2 | 5.095 | 2.940 | | | |
| 3 | 48.253 | 1.200 | 1.77 | 49.5 | L2 |
| 4 | 8.996 | 3.200 | | | |
| 5 | Infinity | 3.000 | 1.92 | 18.9 | L3 |
| 6 | −10.082 | 0.100 | | | |
| 7 | Infinity | 2.600 | | | |
| 8 | 24.662 | 3.400 | 1.51 | 64.1 | L4 |
| 9 | −6.635 | 0.100 | | | |
| 10 | 10.573 | 2.750 | 1.48 | 70.2 | L5 |
| 11 | −10.573 | 1.200 | 1.92 | 18.9 | L6 |
| 12 | 6.427 | 2.100 | | | |
| 13 | 8.415 | 3.200 | 1.77 | 49.5 | L7 |
| 14 | 53.180 | 0.500 | | | |
| 15 | Infinity | 0.400 | 1.51 | 64.1 | L8 |
| 16 | Infinity | 1.104 | | | |
| 17 | Infinity | 0.500 | 1.51 | 64.1 | L9 |

TABLE 5-continued f = 4.462 mm; $F_{no}$ = 2.0; FOV = 145°

| Surface # | Radius of curvature (mm) | Thickness (mm) | Refractive index Nd | Abbe number Vd |
|---|---|---|---|---|
| 18 | Infinity | 0.539 | | |
| 19 | Infinity | | | |

As can be seen from Table 5, the focal length f of the wide-angle lens assembly 20 of the second embodiment is 4.462 mm, the focal length f1 of the first lens L1 is −10.063 mm, the focal length f2 of the second lens L2 is −13.865 mm, the focal length f3 of the third lens L3 is 12.030 mm, the focal length f4 for the fourth lens L4 is 10.932 mm, the focal length f5 of the fifth lens L5 is 8.736 mm for, the focal length f6 of the sixth lens L6 is −4.945 mm, and the focal length f7 of the seventh lens L7 is 16.655 mm, the Abbe number Vd41 of the fourth lens L4 is 64.1, the curvature radius R1 of the object-side surface S1 of the first lens L1 is 29.372 mm, and the curvature radius R2 of the image-side surface S2 of the first lens L1 is 5.095 mm From the above, it can be concluded that f/f7=0.248, f/f6=−0.836, Vd4=64.1, (f1+f2+f3+f4+f5+f6+f7)/f=4.710, and (R1/R2)=5.765, satisfying the aforementioned conditions (1) to (5).

In addition, in conjunction with the parameters show in Table 6, surface sags of each aspheric surface of the second lens L2, the fourth lens L4, and the seventh lens L7 of the wide-angle lens assembly 30 of the third embodiment, i.e., the object-side surfaces S3, S7 and S13, and the image-side surfaces S4, S8 and S14 are obtained by the following formula:

$$z = \frac{ch^2}{1 + \sqrt{1 - (1+k)c^2h^2}} + Ah^4 + Bh^6 + Ch^8 + Dh^{10} + Eh^{12} + Fh^{14} + Gh^{16}$$

where, z is the aspheric surface sag; c is the reciprocal of the curvature radius; h is half the off-axis height of the surface; k is the conic coefficient and A to G respectively represent different order coefficient of h.

TABLE 6

| | L2 | | L4 | | L7 | |
|---|---|---|---|---|---|---|
| | S3 | S4 | S7 | S8 | S13 | S14 |
| K | 0.00000E+00 | 0.00000E+00 | 0.00000E+00 | 0.00000E+00 | 0.00000E+00 | 0.00000E+00 |
| A | −5.69013E−04 | 2.13170E−04 | −5.26458E−04 | 1.85371E−04 | 1.27557E−05 | 2.30313E−04 |
| B | 3.81580E−05 | 7.07398E−05 | −1.83239E−05 | 5.13203E−06 | 7.23251E−06 | −4.48798E−05 |
| C | −1.18312E−05 | −2.67778E−05 | 1.28648E−06 | −3.87316E−06 | −1.21549E−06 | 6.77494E−06 |
| D | 1.59523E−06 | 5.16328E−06 | −4.25458E−07 | 5.18715E−07 | 8.77310E−08 | −6.20409E−07 |
| E | −1.14690E−07 | −5.23070E−07 | 3.82119E−08 | −4.46595E−08 | −2.88987E−09 | 3.16733E−08 |
| F | 4.27592E−09 | 2.74600E−08 | −1.70671E−09 | 1.94234E−09 | 3.82476E−11 | −8.49401E−10 |
| G | −6.40520E−11 | −5.64623E−10 | 1.99151E−11 | −3.58100E−11 | −2.96711E−14 | 9.30212E−12 |

Figure 6A:
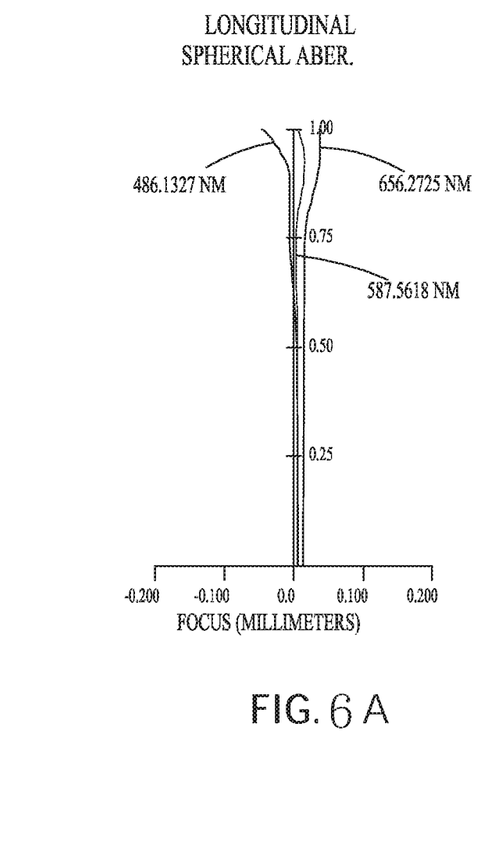
FIG. 6A is a diagram showing a longitudinal spherical aberration of the wide-angle lens assembly according to the third embodiment of the present invention.
Figure 6B:
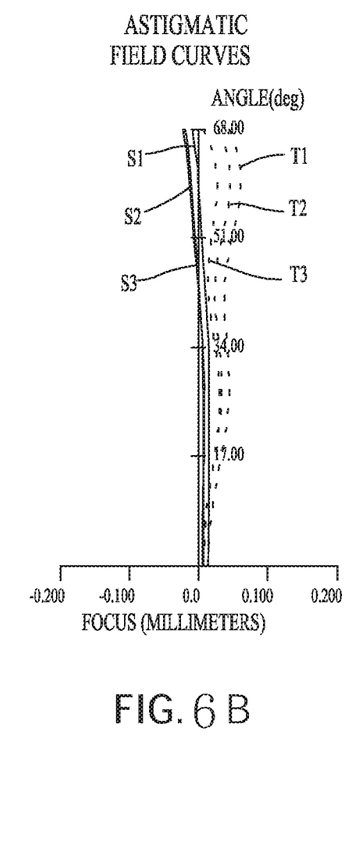
FIG. 6B is a diagram showing astigmatic field curves of the wide-angle lens assembly according to the third embodiment of the present invention.
Figure 6C:
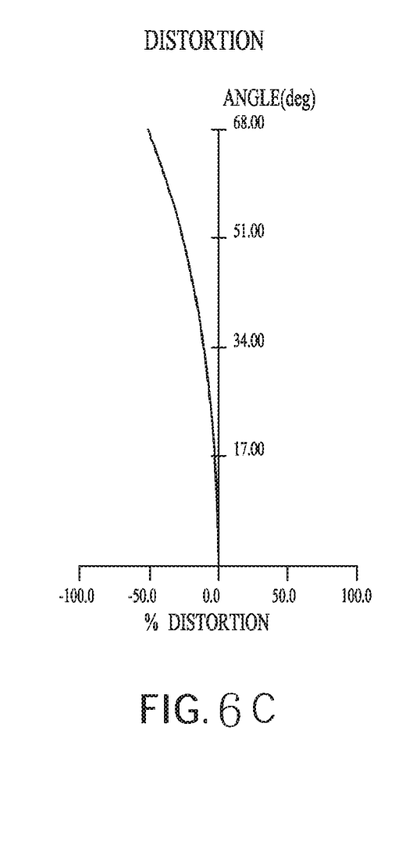
FIG. 6C is a diagram showing distortion of the wide-angle lens assembly according to the third embodiment of the present invention.

As a result, as shown in FIG. 6A to 6C, with the aforementioned design, the wide-angle lens assembly 30 of the third embodiment according to the present invention can meet the requirement for high imaging quality, wherein FIG. 6A shows that the longitudinal spherical aberration does not exceed 0.05 mm; FIG. 6B shows that the maximum field curvature does not exceed 0 mm and 0.05 mm; FIG. 6C shows that the distortion does not exceed −50%.

Figure 7:
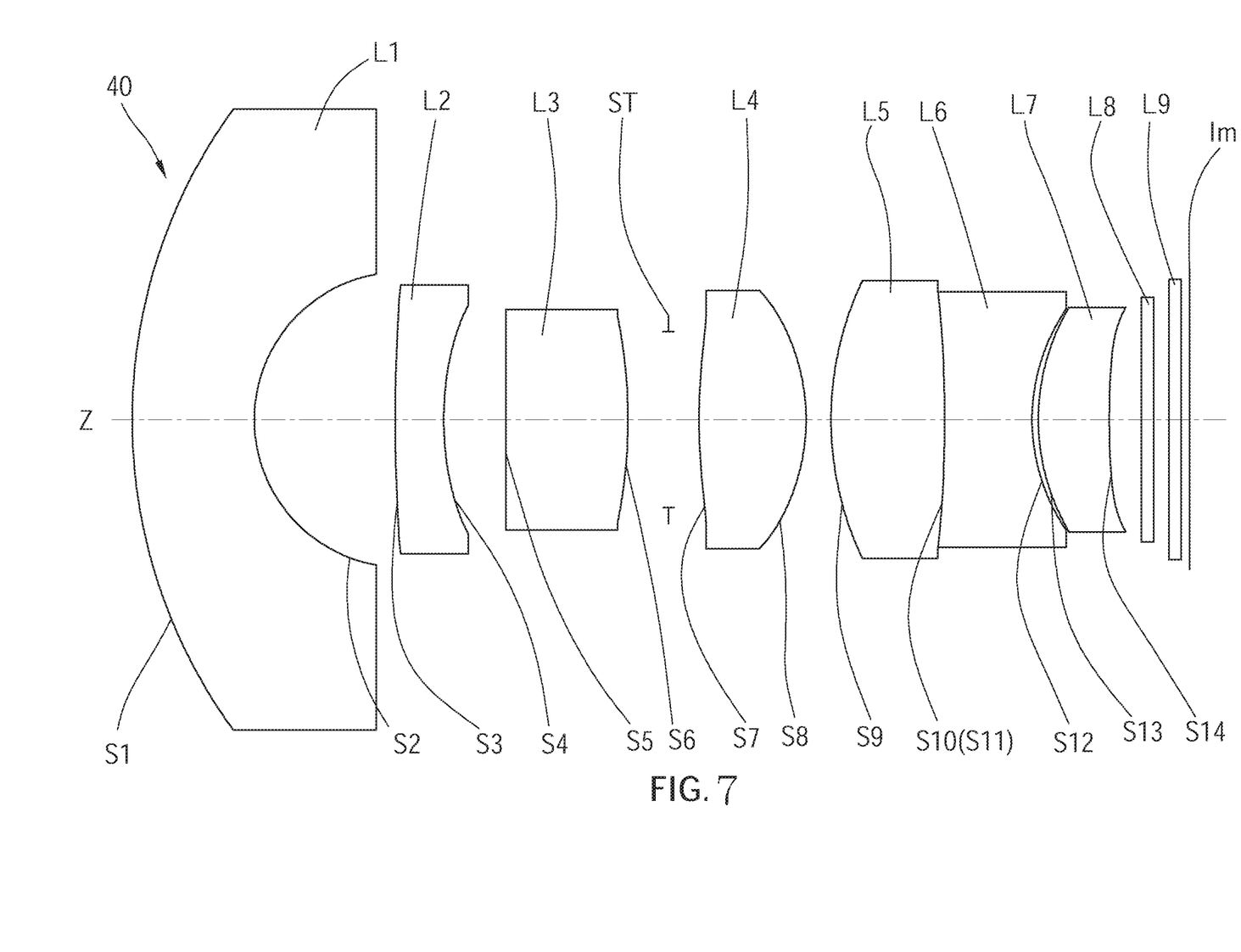
FIG. 7 is a schematic diagram of a wide-angle lens assembly according to a fourth embodiment of the present invention.

As shown in FIG. 7, a wide-angle lens assembly 40 of a fourth embodiment according to the present invention includes, in order from an object side to an image side along an optical axis Z, a first lens L1, a second lens L2, a third lens L3, a fourth lens L4, a fifth lens L5, a sixth lens L6, and a seventh lens L7.

The first lens L1 has negative refractive power, and preferably, the first lens L1 is made of glass and has an object-side surface S1 being convex, and an image-side surface S2 being concave.

The second lens L2 has negative refractive power, and preferably, the second lens L2 is made of glass. In addition, at least one surface of the second lens L2 is aspheric. For example, in the current embodiment, both of an object-side surface S3 and an image-side surface S4 of the second lens L2 are aspheric surfaces.

The third lens L3 has positive refractive power, and preferably, the third lens L3 is made of glass and has an object-side surface S5 being convex and an image-side surface S6 being convex.

The fourth lens L4 has positive refractive power, and preferably, the fourth lens L4 is made of glass. In addition, at least one surface of the fourth lens L4 is aspheric. For example, in the current embodiment, both of an object-side surface S7 and an image-side surface S8 of the fourth lens L4 are aspheric surfaces.

The fifth lens L5 has positive refractive power, and preferably, the fifth lens L5 is made of glass and has an object-side surface S9 being convex and an image-side surface S10 being convex.

The sixth lens L6 has negative refractive power, and preferably, the sixth lens L6 is made of glass and has an object-side surface S11 being concave and an image-side surface S12 being concave.

The seventh lens L7 has positive refractive power, and preferably, the seventh lens L7 is of a meniscus shape made of glass having an object side surface S13 being convex and an image side surface S14 being concave. In addition, at least one surface of the seventh lens L7 is aspheric. For example, in the current embodiment, both of the object-side surface S13 and the image-side surface S14 of the seventh lens L7 are aspheric surfaces.

In addition, it is preferable that the fifth lens L5 is adhered to the sixth lens L6 to form a doublet, thereby effectively improving the chromatic aberration of the lens assembly and avoiding generation of aberration.

Furthermore, in order to maintain good optical performance of the wide-angle lens assembly 40 of the present invention, the wide-angle lens assembly 40 satisfies the following conditions:

$$0.2 < f/f7 < 0.5; \quad (1)$$

$$-0.9 < f/f6 < -0.4; \quad (2)$$

$Vd4>60;$ (3)

$4<(f1+f2+f3+f4+f5+f6+f7)/f<6;$ (4)

$3<(R1/R2)<6;$ (5)

where, f is a focal length of the wide-angle lens assembly 40; f1 is a focal length of the first lens L1; f2 is a focal length of the second lens L2; f3 is a focal length of the third lens L3; f4 is a focal length of the fourth lens L4; f5 is a focal length of the fifth lens L5; f6 is a focal length of the sixth lens L6; f7 is a focal length of the seventh lens L7; Vd4 is an Abbe number of the fourth lens L4; R1 is a curvature radius (R value) of the object-side surface S1 of the first lens L1; R2 is a curvature radius (R value) of the image-side surface S2 of the first lens L1.

With the above design, the wide-angle lens assembly 40 can have better optical imaging quality and a larger angle of view. In more details, by satisfying the aforementioned conditions (1) and (5), it can effectively enhance the wide-angle characteristic and provide a larger angle of view for the lens assembly; by satisfying the aforementioned condition (2), it can effectively correct each kind of aberrations for the lens assembly; by satisfying the aforementioned conditions (3) and (4), chromatic aberration can be effectively eliminated.

In addition, the wide-angle lens assembly 40 can further include an aperture ST, a filter L8, and a protective glass L9. The aperture ST is disposed between the third lens L3 and the fourth lens L4. The filter L8 is disposed between the seventh lens L7 and the image plane $I_m$, and can be an infrared filter. Wherein, the filter L8 has an object-side surface and an image-side surface, both of which are planar, and the material thereof is glass, which would not affect the focal length of the wide-angle lens assembly 40. The protective glass L9 is disposed between the filter L8 and the image plane $I_m$. Wherein, the protective glass L9 has an object-side surface and an image-side surface, both of which are planar, and the material thereof is glass, which would not affect the focal length of the wide-angle lens assembly 40.

The parameters of the lenses of the wide-angle lens assembly 40 of the fourth embodiment according to the present invention are shown in Table 7, which includes a focal length f, an aperture value $F_{no}$ and an angle of view FOV of the wide-angle lens assembly 30, a curvature radius R of each lens, and a distance between each surface to a next surface on the optical axis, a refractive index Na for each lens, and an Abbe number $V_d$ for each lens, wherein the units of the focal length, curvature radius, and thickness are expressed in mm

TABLE 7 f = 4.262 mm; $F_{no}$ = 2.0; FOV = 145°

| Surface # | Radius of curvature (mm) | Thickness (mm) | Refractive index Nd | Abbe number Vd | |
|---|---|---|---|---|---|
| 1 | 17.226 | 4.000 | 1.8 | 46.5 | L1 |
| 2 | 4.830 | 4.612 | | | |

TABLE 7-continued f = 4.262 mm; $F_{no}$ = 2.0; FOV = 145°

| Surface # | Radius of curvature (mm) | Thickness (mm) | Refractive index Nd | Abbe number Vd | |
|---|---|---|---|---|---|
| 3 | 45.652 | 1.590 | 1.77 | 49.5 | L2 |
| 4 | 10.108 | 2.035 | | | |
| 5 | 4048.597 | 4.000 | 1.92 | 18.9 | L3 |
| 6 | −16.995 | 1.325 | | | |
| 7 | Infinity | 1.001 | | | |
| 8 | 18.182 | 3.509 | 1.51 | 64.1 | L4 |
| 9 | −6.731 | 0.818 | | | |
| 10 | 10.573 | 3.724 | 1.48 | 70.2 | L5 |
| 11 | −40.000 | 2.862 | 1.92 | 18.9 | L6 |
| 12 | 6.427 | 0.207 | | | |
| 13 | 7.369 | 2.317 | 1.77 | 49.5 | L7 |
| 14 | 31.000 | 1.056 | | | |
| 15 | Infinity | 0.400 | 1.51 | 64.1 | L8 |
| 16 | Infinity | 0.500 | | | |
| 17 | Infinity | 0.400 | 1.51 | 64.1 | L9 |
| 18 | Infinity | 0.279 | | | |
| 19 | Infinity | | | | |

As can be seen from Table 7, the focal length f of the wide-angle lens assembly 20 of the second embodiment is 4.262 mm, the focal length f1 of the first lens L1 is −12.309 mm, the focal length f2 of the second lens L2 is −16.474 mm, the focal length f3 of the third lens L3 is 20.301 mm, the focal length f4 for the fourth lens L4 is 10.368 mm, the focal length f5 of the fifth lens L5 is 11.646 mm for, the focal length f6 of the sixth lens L6 is −6.360 mm, and the focal length f7 of the seventh lens L7 is 15.999 mm, the Abbe number Vd41 of the fourth lens L4 is 64.1, the curvature radius R1 of the object-side surface S1 of the first lens L1 is 17.226 mm, and the curvature radius R2 of the image-side surface S2 of the first lens L1 is 4.830 mm From the above, it can be concluded that f/f7=0.266, f/f6=−0.670, Vd4=64.1, (f1+f2+f3+f4+f5+f6+f7)/f=5.430, and (R1/R2)=3.566, satisfying the aforementioned conditions (1) to (5).

In addition, in conjunction with the parameters show in Table 8, surface sags of each aspheric surface of the second lens L2, the fourth lens L4, and the seventh lens L7 of the wide-angle lens assembly 40 of the fourth embodiment, i.e., the object-side surfaces S3, S7 and S13, and the image-side surfaces S4, S8 and S14 are obtained by the following formula:

$$z = \frac{ch^2}{1+\sqrt{1-(1+k)c^2h^2}} + Ah^4 + Bh^6 + Ch^8 + Dh^{10} + Eh^{12} + Fh^{14} + Gh^{16}$$

where, z is the aspheric surface sag; c is the reciprocal of the curvature radius; h is half the off-axis height of the surface; k is the conic coefficient and A to G respectively represent different order coefficient of h.

TABLE 8

| | L2 | | L4 | | L7 | |
|---|---|---|---|---|---|---|
| | S3 | S4 | S7 | S8 | S13 | S14 |
| K | 0.00000E+00 | 0.00000E+00 | 0.00000E+00 | 0.00000E+00 | 0.00000E+00 | 0.00000E+00 |
| A | −3.52051E−04 | 1.52342E−04 | −3.98475E−04 | 1.92565E−04 | 1.27557E−05 | 5.11769E−04 |

TABLE 8-continued

| | L2 | | L4 | | L7 | |
|---|---|---|---|---|---|---|
| | S3 | S4 | S7 | S8 | S13 | S14 |
| B | 5.24330E−05 | 6.79134E−05 | −1.70707E−05 | 6.17831E−06 | 3.49941E−05 | 8.43979E−05 |
| C | −1.21219E−05 | −2.56779E−05 | 1.49133E−06 | −3.75837E−06 | −2.30283E−06 | 4.66958E−06 |
| D | 1.61032E−06 | 5.15786E−06 | −4.26010E−07 | 5.15744E−07 | 4.59270E−08 | −5.79764E−07 |
| E | −1.14690E−07 | −5.24017E−07 | 3.82119E−08 | −4.46595E−08 | −2.88987E−09 | 3.16733E−08 |
| F | 4.27592E−09 | 2.71861E−08 | −1.70671E−09 | 1.94234E−09 | 3.82476E−11 | −8.49401E−10 |
| G | −6.44197E−11 | −5.64623E−10 | 1.99151E−11 | −3.59077E−11 | −2.96711E−14 | 9.30212E−12 |

Figure 8A:
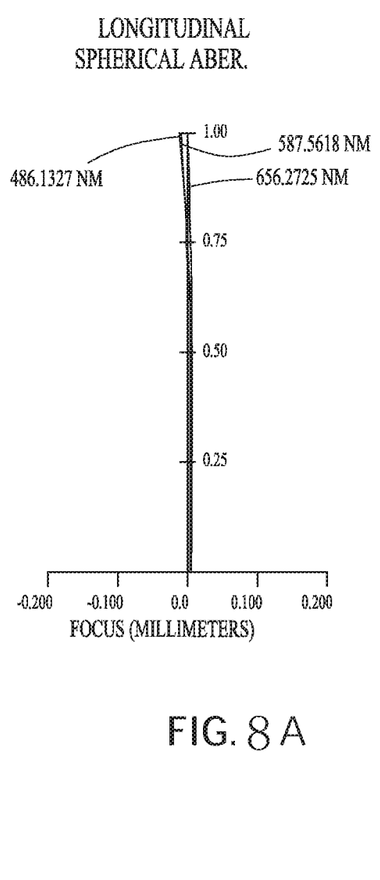
FIG. 8A is a diagram showing a longitudinal spherical aberration of the wide-angle lens assembly according to the fourth embodiment of the present invention.
Figure 8B:
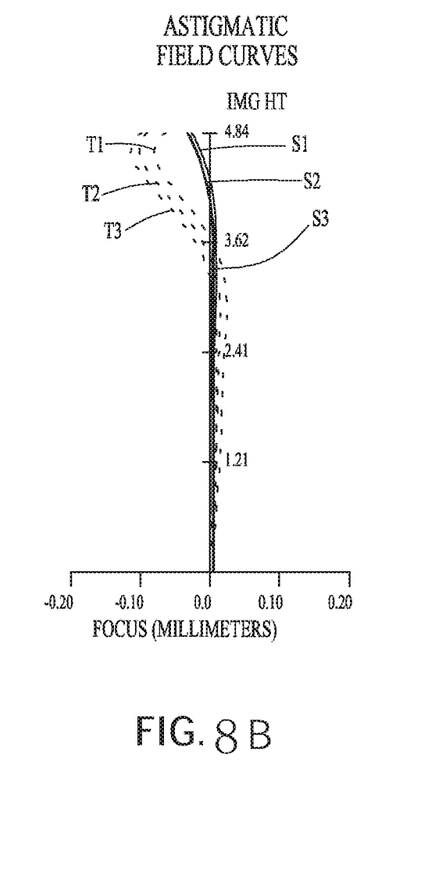
FIG. 8B is a diagram showing astigmatic field curves of the wide-angle lens assembly according to the fourth embodiment of the present invention.
Figure 8C:
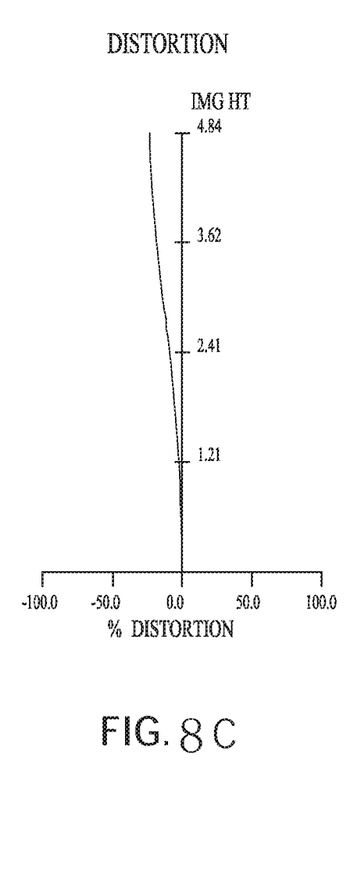
FIG. 8C is a diagram showing distortion of the wide-angle lens assembly according to the fourth embodiment of the present invention.

As a result, as shown in FIG. 8A to 8C, with the aforementioned design, the wide-angle lens assembly 40 of the fourth embodiment according to the present invention can meet the requirement for high imaging quality, wherein FIG. 8A shows that the longitudinal spherical aberration does not exceed 0.005 mm; FIG. 8B shows that the maximum field curvature does not exceed −0.05 mm and 0.05 mm; FIG. 8C shows that the distortion does not exceed −50%.

In summary, with the aforementioned configuration and optical conditions, the wide-angle lens assembly of the present invention can provide a FOV greater than 140 degrees. In addition, the total length of the wide-angle lens assembly is reduced, the aberration is corrected, and the image resolution is improved.

It must be pointed out that the embodiments described above are only some preferred embodiments of the present invention. All equivalent structures which employ the concepts disclosed in this specification and the appended claims should fall within the scope of the present invention.

What is claimed is:

1. A wide-angle lens assembly, in order from an object side to an image side along an optical axis, comprising:
    a first lens with negative refractive power;
    a second lens with negative refractive power;
    a third lens with positive refractive power;
    a fourth lens with positive refractive power;
    a fifth lens with positive refractive power;
    a sixth lens with negative refractive power; and
    a seventh lens with positive refractive power; wherein, the wide-angle lens assembly satisfies the following condition:

$0.2 < f/f7 < 0.5$;

where f is a focal length of the wide-angle lens assembly and f7 is a focal length of the seventh lens.

2. The wide-angle lens assembly as claimed in claim 1, wherein the fifth lens is adhered to the sixth lens to form a doublet.

3. The wide-angle lens assembly as claimed in claim 1, wherein the wide-angle lens assembly further satisfies the following condition:

$-0.9 < f/f6 < -0.4$;

where f6 is the focal length of the sixth lens.

4. The wide-angle lens assembly as claimed in claim 1, wherein the wide-angle lens assembly further satisfies the following condition:

$Vd4 > 60$;

where Vd4 is an Abbe number of the fourth lens.

5. The wide-angle lens assembly as claimed in claim 1, wherein the wide-angle lens assembly further satisfies the following condition:

$4 < (f1+f2+f3+f4+f5+f6+f7)/f < 6$;

where f1 is a focal length of the first lens; f2 is a focal length of the second lens; f3 is a focal length of the third lens; f4 is a focal length of the fourth lens; f5 is a focal length of the fifth lens; f6 is a focal length of the sixth lens.

6. The wide-angle lens assembly as claimed in claim 1, wherein the wide-angle lens assembly further satisfies the following condition:

$3 < (R1/R2) < 6$;

where R1 is an R value of an object-side surface of the first lens; R2 is an R value of an image side of the first lens.

7. The wide-angle lens assembly as claimed in claim 1, wherein at least one surface of the second lens is aspheric.

8. The wide-angle lens assembly as claimed in claim 1, wherein at least one surface of the fourth lens is aspheric.

9. The wide-angle lens assembly as claimed in claim 1, wherein at least one surface of the seventh lens is aspheric.

10. The wide-angle lens assembly of claim 1, wherein the seventh lens is of a meniscus shape having an object side surface being convex and an image side surface being concave.

\* \* \* \* \*